United States Patent [19]
Kochis et al.

[11] Patent Number: 5,280,585
[45] Date of Patent: Jan. 18, 1994

[54] DEVICE SHARING SYSTEM USING PCL MACROS

[75] Inventors: Richard L. Kochis; Michael D. Erickson, both of Fort Collins, Colo.

[73] Assignee: Hewlett-Packard Company, Palo Alto, Calif.

[21] Appl. No.: 590,878

[22] Filed: Sep. 28, 1990

[51] Int. Cl.⁵ .............................................. G06F 13/14
[52] U.S. Cl. ................................. 395/275; 395/725; 364/238.2; 364/231.5; 364/DIG. 1; 364/919.1; 364/942.3; 364/DIG. 2; 358/442
[58] Field of Search ............ 364/900, 919.1, DIG. 2, 364/238.2, 231.5, 42.3, 9, DIG. 1; 395/275, 325, 725; 358/407, 425, 442

[56] References Cited

U.S. PATENT DOCUMENTS

| | | | |
|---|---|---|---|
| 4,004,277 | 1/1977 | Gavril | 364/200 |
| 4,525,806 | 6/1985 | Barnes et al. | 364/900 X |
| 4,922,348 | 5/1990 | Gillon et al. | 358/442 |
| 4,947,345 | 8/1990 | Paradise et al. | 364/519 |
| 5,047,957 | 9/1991 | Ikenoue | 364/900 |
| 5,113,355 | 5/1992 | Nomura | 395/110 |
| 5,140,675 | 8/1992 | Okada | 395/114 |

Primary Examiner—Michael R. Fleming
Assistant Examiner—Glenn A. Auve

[57] ABSTRACT

Disclosed is a switch that allows a peripheral device, such as a PCL printer, to be shared by multiple computer systems. The switch connects to each of the computer systems, and also to the peripheral device being shared. The first system is considered the primary user of the peripheral device, so when the second system requests access to the peripheral device, the switch causes the peripheral device to save its state temporarily while the second system uses the device. When the second system's use is complete, the switch causes the peripheral device to restore its state to the last state established by the first system. Therefore, the first system need not know that the other system used the peripheral device, since the state of the peripheral device appears unchanged from the last time the first system used the device.

15 Claims, 4 Drawing Sheets

DEVICE SHARING SYSTEM USING PCL MACROS

RELATED APPLICATIONS

This application is related to application Ser. No. 07/589,949, filed concurrently herewith, of Brian L. Hastings, entitled "Switch for Sharing a Peripheral Device."

FIELD OF THE INVENTION

This invention relates to computer systems and more particularly to sharing peripheral devices on such systems. Even more particularly, the invention relates to sharing a peripheral device between two or more computers or other systems.

BACKGROUND OF THE INVENTION

In computer systems, particularly small or personal computer systems, peripheral devices make up a large part of the cost of the system. Where possible, it is desirable to share peripheral devices between several computer systems.

In small computer systems, especially personal computer systems, the hardware and operating system software may lack the sophistication necessary to allow such sharing. Therefore, if peripherals in such systems are to be shared, the user of the system must manually re-initialize the peripheral device each time the computer systems are switched. This is very time consuming, and very difficult if the computer systems that share the device are not in close proximity.

For some peripheral devices, such as printers, prior art manual switches may be used to switch the electrical connections from one computer system to another. Each time the interface to the peripheral is switched, the computer now having control of the peripheral must re-initialize the peripheral to reestablish the state of the peripheral device. In the case of printers, this reinitialization involves restoring the printing resolution, page orientation (landscape or portrait), margins, fonts selected, page size, and many other parameters. If the printer is being used by a word processing system, the user may not be aware of these parameters, and thus may be unable to re-initialize the printer to the state it had before being switched to the other computer system.

There is a need in the art then for a peripheral switch that allows a peripheral device to be shared between two or more computer systems. There is further need in the art for such a switch that saves the state of the peripheral device for each of the sharing computer systems. A still further need is for such a switch that automatically restores the state of the peripheral each time the interface is switched, thus providing transparent switching. The present invention meets these needs.

SUMMARY OF THE INVENTION

It is an aspect of the present invention to allow two or more computer systems to share a peripheral device.

It is another aspect of the invention to cause the shared peripheral device to save its state temporarily while the second computer system is in control.

Another aspect is to restore the peripheral device to the last state established by a computer before accepting commands from that computer.

A further aspect of the invention is to store data from a nonselected host until the peripheral device is available to process such data.

The above and other objects of the invention are accomplished in a switch that allows a peripheral device, such as a printer, to be shared by multiple computer systems. The switch connects to each of the computer systems, and also to the peripheral device being shared. The first system is considered the primary user of the peripheral device, so when the second system requests access to the peripheral device, the switch causes the peripheral device to save its state temporarily while the second system uses the device. When the second system's use is complete, the switch causes the peripheral device to restore its state to the last state established by the first system. Therefore, the first system need not know that the other system used the peripheral device, since the state of the peripheral device appears unchanged from the last time the first system used the device.

In one embodiment of the switch, a PCL printer, such as Hewlett Packard LaserJet Series II or Series III, is shared by a host computer system and a remote facsimile (FAX) device. When data is received from the FAX, this data is placed into a macro, and the macro is sent to the printer. When a macro is received by a PCL printer, the printer will save its state, perform the macro, and restore its state. Therefore, if the FAX data is within a macro, the data will be printed, while the printer state will appear unchanged to the host computer system.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
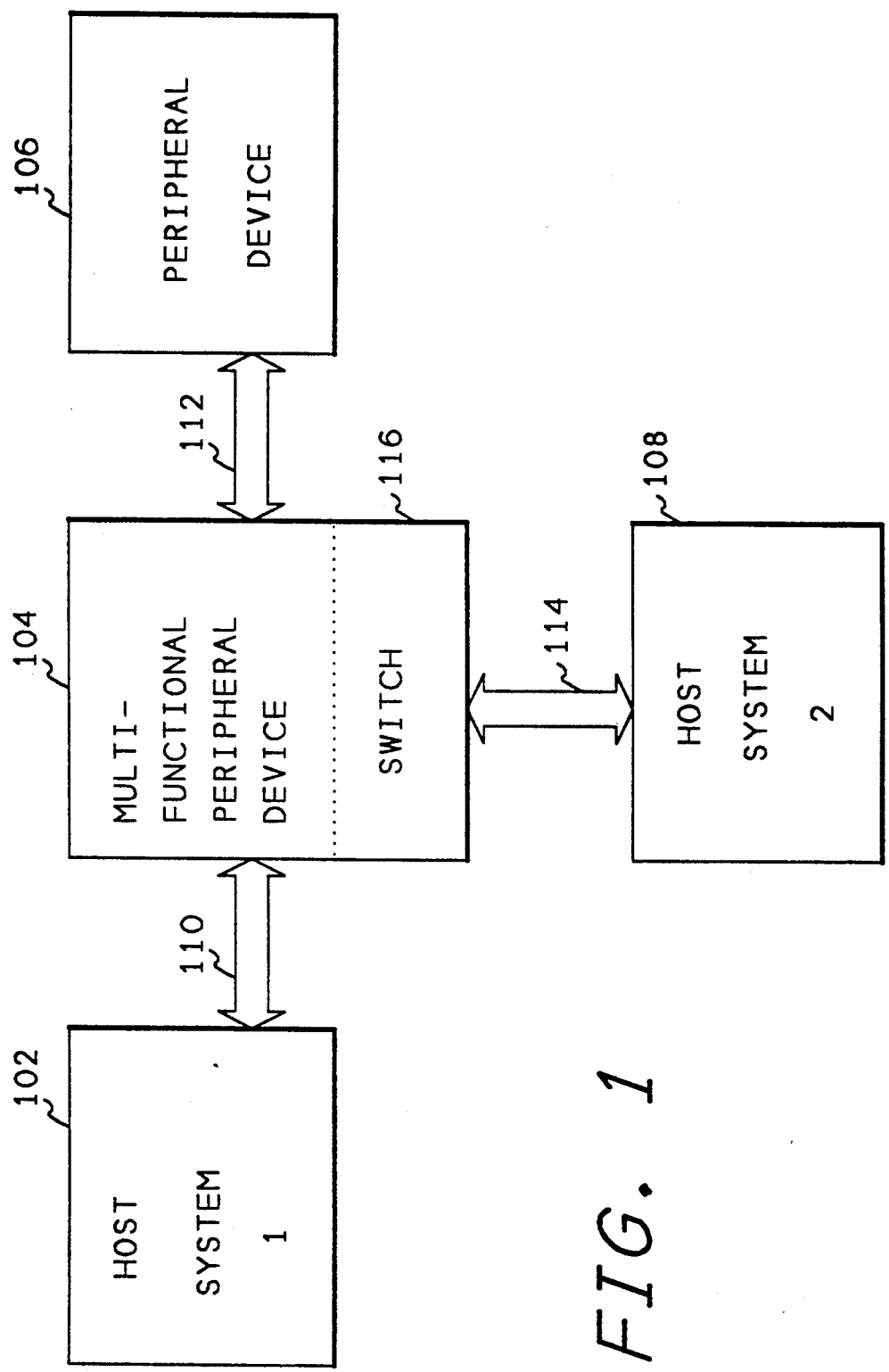
FIG. 1 shows a block diagram of the system of the present invention and its environment.

FIG. 1 shows a block diagram of the present invention and its environment. Referring now to FIG. 1, a first host system 102 is connected over a bus 110 to a multi-function peripheral device 104 which contains the switch 116 of the present invention. The switch 116 is connected via a bus 112 to a peripheral device 106 which is being shared. A second host system 108 is connected via a bus 114 to the switch 116. The switch 116 of the present invention allows the first host system 102 and the second host system 108 to share the peripheral device 106.

Figure 2:
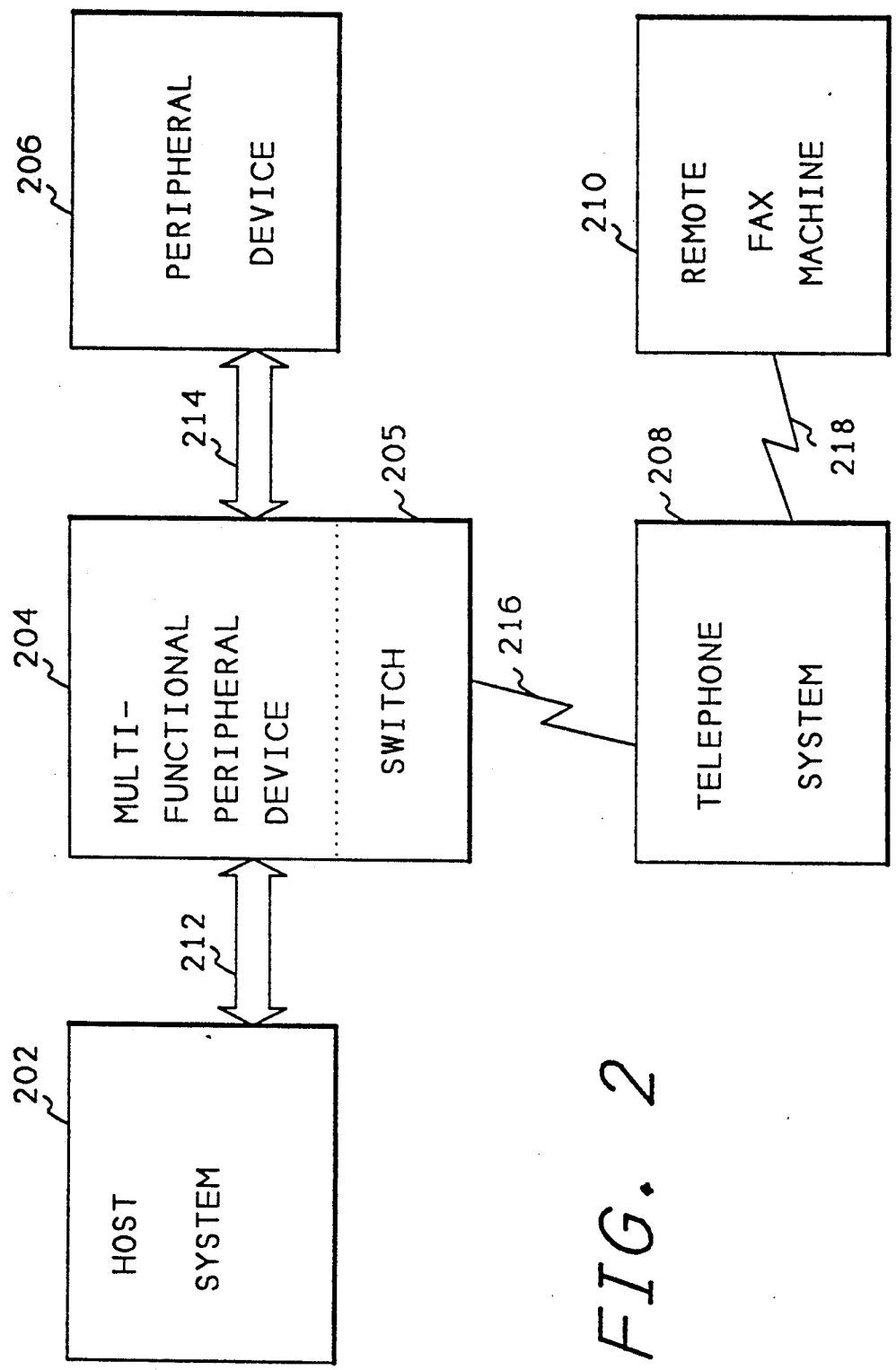
FIG. 2 shows a block diagram of the system being used to share a printer between a host computer and a remote FAX machine.

FIG. 2 shows a block diagram wherein the present invention is used to connect a host system and a remote FAX machine to a printer. Referring now to FIG. 2, a host system 202 is connected via a bus 212 to a multi-function peripheral device 204 which contains the switch 205 of the present invention. A remote FAX machine 210 is connected via wires 218 to a telephone system 208. The telephone system 208 is connected via wires 216 switch 205. The present invention 204 containing the switch 205 is connected via a bus 214 to a printer 206.

The switch 205 of the present invention, which is contained in the multi-functional peripheral device 204, allows the host system 202 to share the printer 206 with the remote FAX system 210. The multi-functional peripheral device 204 receives calls from the remote FAX machine 210 and the switch 205, within the multi-functional peripheral device 204, reconfigures the printer 206 to allow it to receive a FAX from the remote FAX machine 210. This reconfiguration is done by signaling the printer to save its state temporarily by sending the printer a macro that includes the FAX data. After the FAX transmission is complete, the switch 205 sends a last section of the macro to the printer 206 to cause the printer 206 to print the FAX data and restore the same state the printer was in prior to the FAX transmission. Therefore, the host system 202 is unaware that the printer has been used to receive a FAX.

Figure 3:
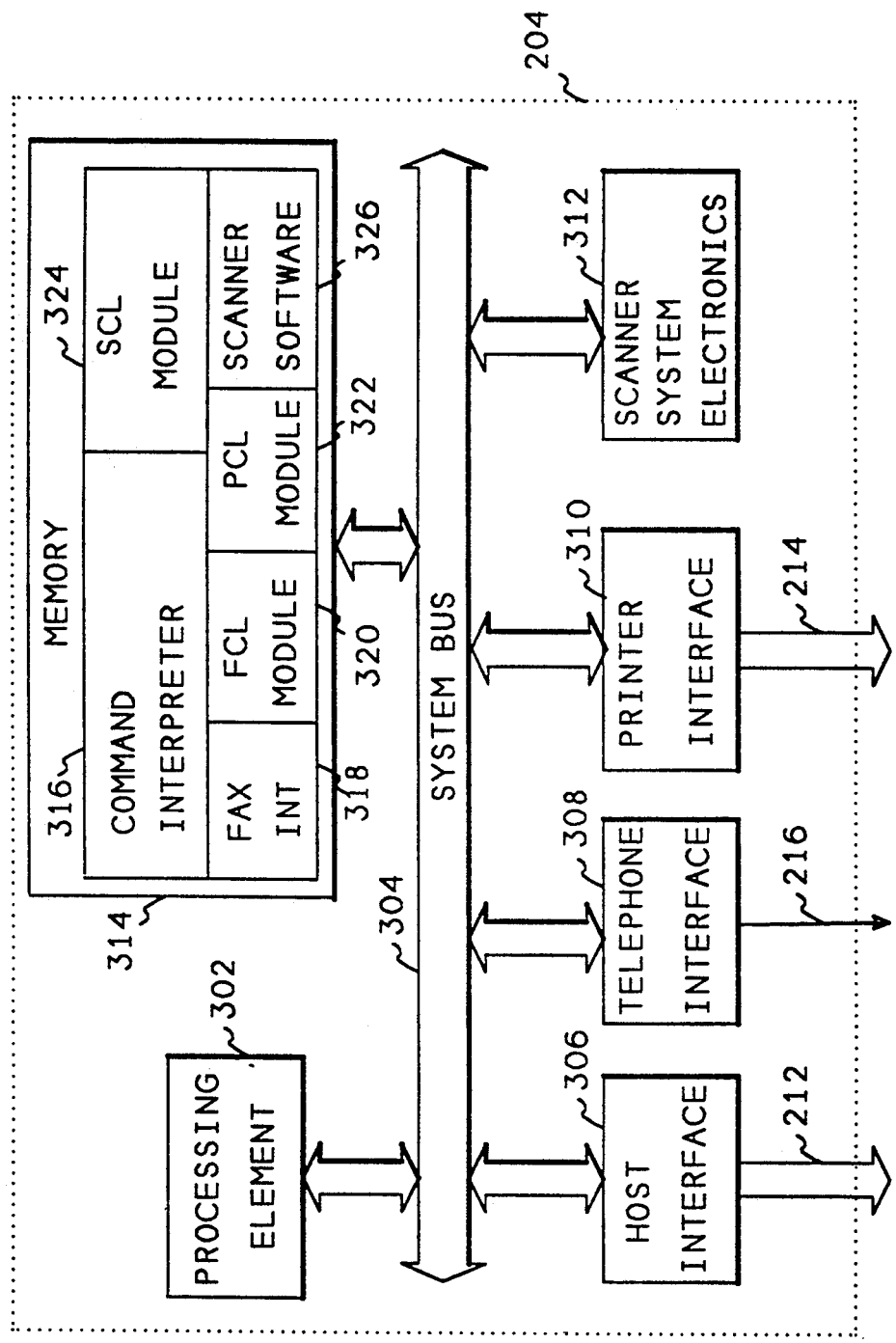
FIG. 3 shows a block diagram of the multi-functional peripheral device, containing the switch of the present invention.
Figure 4:
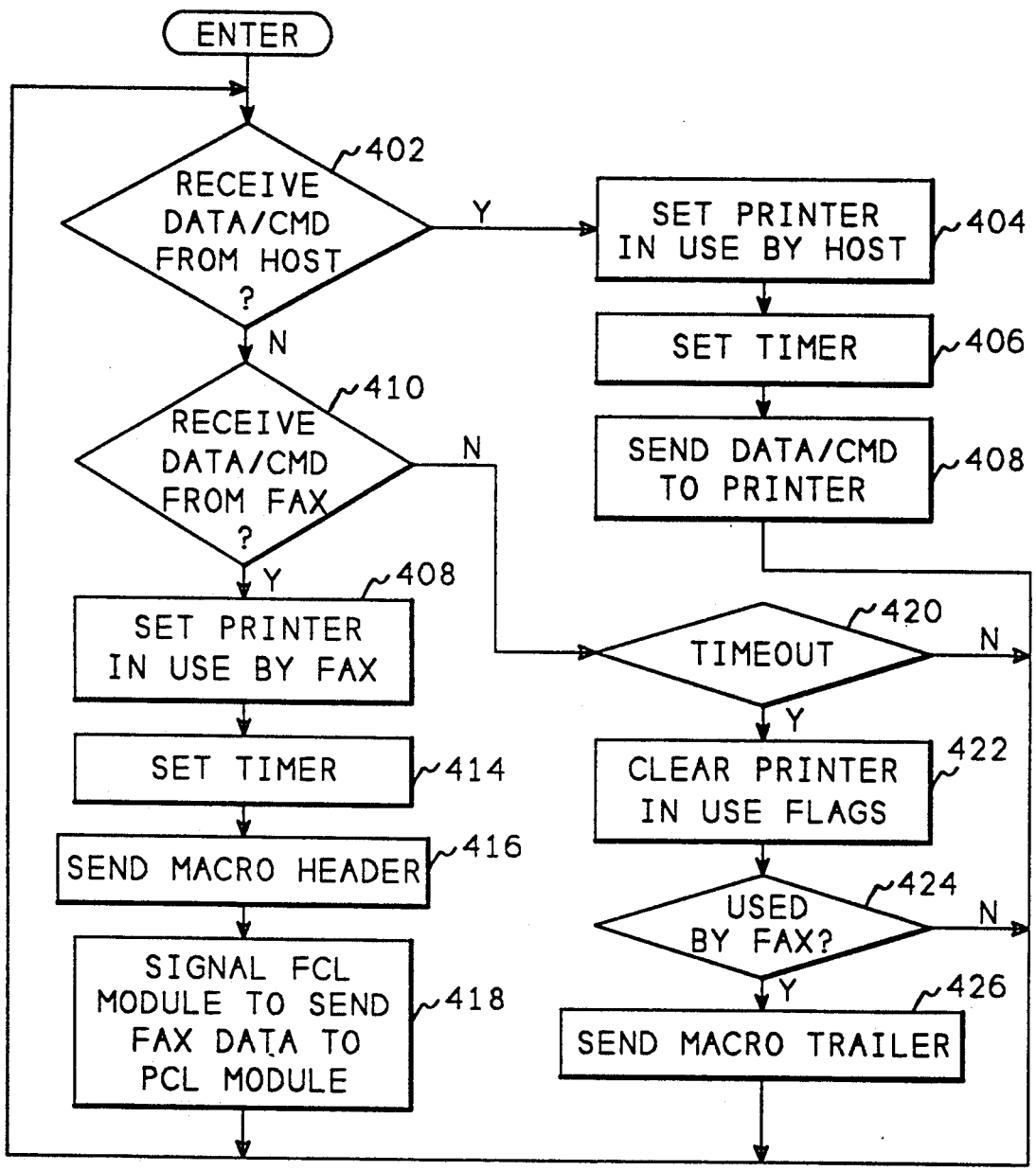
FIG. 4 shows a flowchart of the software within the switch of the present invention.

FIGS. 3 and 4 show an example of the present invention, implemented to share a PCL printer, such as the Hewlett Packard LaserJet Series II or Series III, between a host computer and a remote FAX machine.

FIG. 3 shows a block diagram of the multi-functional peripheral device 204, which contains the switch of the present invention. Referring now to FIG. 3, the multi-functional peripheral device 204 contains a processor 302 which communicates to other elements of the system over a system bus 304. A host system interface 306 is used to communicate with the host system 202 over the bus 212. A telephone interface 308 is used to communicate to the remote FAX 210 (FIG. 2) via the telephone system 208 (FIG. 2) over the wires 216. A printer interface 310 is used to send data to the printer 206 over the bus 214. Scanner system electronics 312 are used with a data scanning device which may also be part of the multi-functional peripheral device 204. A memory 314 contains a command interpreter 316 which receives commands from the host interface 306 and the telephone interface 308 and routes the appropriate commands and data to the printer interface 310. The command interpreter 316 will be described below with respect to FIG. 4. A FAX interface 318 is used to drive the telephone interface 308 and FCL module 320 is used to process commands sent by the host system in order to set up parameters and process commands for the remote FAX machine 210 (FIG. 2). The FCL module 320 sends commands and data to the command interpreter 316 which processes those commands and sends them to the printer 206. The FCL module 320 also sends data directly to a PCL module 322. The PCL module 322 receives commands and data from the command interpreter and the FCL module 320, and passes those commands through the printer interface 310 to the printer 206 (FIG. 2). An SCL module 324 receives scanner command language commands from the host system and passes those commands to scanner system software 326 which interfaces to the scanner system electronics 312.

This invention takes advantage of the fact that PCL printers save the state of the printer before performing a requested macro. Therefore, when the invention receives a FAX message, it places the FAX data within a PCL macro, sends the macro to the printer, and performs the macro. The printer, in performing the macro, will save the printer state, print the FAX data, and restore the printer state before indicating that the print is complete.

Table 1 shows a macro suitable for use with the present invention. In the following description of Table 1, the Σ character represents the ASCII escape character. Line 1 gives the macro a number (99) for reference. Line 2 begins the definition of the macro. Line 3 sets the printer to use portrait orientation, and line 4 sets the paper size to letter size paper. Line 5 sets the printer to use 300 dots per inch graphics mode, and line 6 begins raster graphics data. Lines 1 through 6 make up the macro header in the example of FIGS. 3 and 4.

Line 7 of table 1 would be replaced by the graphics data to be printed. In the example of FIGS. 3 and 4, line 7 would be replaced by the data received from the remote FAX machine.

Line 8 defines the end of the graphics data, and line 9 ends the macro definition. Line 10 calls the macro and causes the data to print, and line 11 deletes the macro from the printer's memory, to conserve memory space. Lines 8 through 11 make up the macro trailer in the example of FIGS. 3 and 4.

FIG. 4 shows a flowchart of the software of the command interpreter 316 of FIG. 3. This software is used to perform the switch function of the present invention, in conjunction with hardware described by the block diagram of FIG. 3. Referring now to FIG. 4, after entry, block 402 determines whether data or commands have been received from the host over the host interface 306. If data or a command has been received from the host, block 402 transfers to block 404 which sets a flag indicating that the printer is being used by the host computer system. Block 406 then sets a timer, typically 10 to 15 seconds, which will be used to clear the printer in use flag if the host discontinues sending data to the printer. Block 408 then sends the data or command to the printer before returning to block 402 to continue the loop.

If data or a command has been received from the FCL module 320, block 410 transfers to block 412 which sets a flag indicating that the printer is currently being used by the FAX system. Block 414 then sets a timer value, block 416 sends a macro header for the PCL macro that will cause the printer to save its state (i.e. lines 1 through 6 of the macro of Table 1), and block 418 signals the FCL module 320 to send FAX data from the remote FAX system directly to the PCL module 322 which in turn sends it to the printer to cause the printer print the FAX data. Block 418 then continues the loop back to block 402.

Because of memory limitations in the printer 206, each page of FAX data would, in the preferred embodiment, be sent as a separate macro. Therefore, when an end of page indication is received by the FCL module, it would send a macro trailer, to print the page, and then send a new macro header to start a new page.

If a command or data has not been received from the host, block 402 transfers to block 410 which determines whether data or a command has been received from the FCL module 320. If nothing has been received from the FCL module, block 410 transfers to block 420 which determines whether any timeouts have occurred and if no timeouts have occurred, block 420 transfers back to block 402 to continue the loop.

Each time through the loop, if no data is currently being received from the host or the FAX machine, the timeout block 420 determines whether either the host or the FAX system has completed usage of the printer. If a timeout occurs, block 420 transfers to block 422 which clears any printer-in-use flags and then block 424 determines whether the printer was last used by the FAX system. If the printer was last used by the FAX system, block 424 transfers to block 426 which sends a macro trailer to complete the macro and cause the printer to print the FAX data. After sending the macro trailer or if the printer was last used by the host system, control returns to block 402 to continue the loop.

Each time data is received from the host or from the remote FAX, the timer value will be set to a new value, typically ten or fifteen seconds. When data is not being received, the timer is decremented and when it reaches zero, the switch stops usage of the printer. The FAX may also send an end of transmission signal which will cause the FCL module 320 to set the time value to zero, thus terminating usage by the FAX.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| Line | Macro Statement |
|------|-----------------|
| 1 | Σ&f99y |
| 2 | Σ&f0X |
| 3 | Σ&l0O |
| 4 | Σ&l2A |
| 5 | Σ*t300R |
| 6 | Σ*r0A |
| 7 | (raster graphics data for the page) |
| 8 | Σ*rB |
| 9 | Σ&f1X |
| 10 | Σ&f3X |
| 11 | Σ&f8X |

What is claimed is:

1. A system for sharing a printer between a first computer and a second computer, said system comprising:
   a first interface connected between said system and said first computer for transferring data and commands from said first computer to said system;
   a second interface connected between said system and said second computer for transferring data and commands from said second computer to said system;
   a printer interface connected between said system and said printer for transferring data and commands from said system to said printer;
   means for connecting said first interface to said printer interface; and
   means for interrupting said connecting of said first interface and for connecting said second interface to transfer information to said printer interface, said means for interrupting comprising
      means for copying data received from said second interface to a predefined macro within a memory of said system, and
      means for transferring said predefined macro from said memory to said printer interface, whereby said macro and said copied data are transferred to said printer.

2. The system of claim 1 wherein said means for interrupting further comprises means for continuously examining said first interface and said second interface and for connecting said second interface to said printer interface upon receiving a datum or a command from said second interface.

3. The system of claim 2 further comprising means for disconnecting said second interface from said printer interface and reconnecting said first interface to said printer interface if said second computer sends a termination signal.

4. The system of claim 2 further comprising means for disconnecting said second interface from said printer interface and reconnecting said first interface to said printer interface if said second interface has not received a datum or a command for a predetermined period of time.

5. The system of claim 1 wherein said predefined macro causes said printer to save a previous state of said printer prior to printing said copied data and causes said printer to restore said previous state of said printer after printing said copied data.

6. A system for sharing a printer between a host computer and a facsimile receiver, said system comprising:
   a host interface, connected between said host computer and said system, for transferring data and commands from said host computer to said system;
   a fax interface, connected between said facsimile receiver and said system, for transferring data and commands from said facsimile receiver to said system;
   a printer interface, connected between said system and said printer, for transferring data and commands from said system to said printer;
   means for connecting said host interface to said printer interface; and
   means for interrupting said connecting of said host interface to said printer interface and for connecting said fax interface to said printer interface to transfer information to said printer transfer means, said means for interrupting comprising
      means for copying data received from said fax interface to a predefined macro within a memory of said system, and
      means for transferring said predefined macro to said printer interface, whereby said predefined macro and said copied data are transferred to said printer.

7. The system of claim 6 wherein said means for interrupting further comprises means for continuously examining said host interface and said fax interface and for connecting said fax interface to said printer interface upon receiving a datum or a command from said fax interface.

8. The system of claim 7 further comprising means for disconnecting said fax interface from said printer interface and reconnecting said host interface to said printer interface if said fax interface sends a termination signal.

9. The system of claim 7 further comprising means for disconnecting said fax interface from said printer interface and reconnecting said host interface to said printer interface if said fax interface has not received a datum or a command for a predetermined period of time.

10. The system of claim 6 wherein said predefined macro causes said printer to save a previous state of said printer prior to printing said copied data and causes said printer to restore said previous state of said printer after printing said copied data.

11. A system for sharing a printer between a first computer and a second computer, said system comprising:
- a first interface connected between said system and said first computer for transferring data and commands from said first computer to said system;
- a second interface connected between said system and said second computer for transferring data and commands from said second computer to said system;
- a printer interface connected between said system and said printer for transferring data and commands from said system to said printer;
- means for connecting said first interface to said printer interface; and
- means for interrupting said connecting of said first interface, without interrupting said first computer, and for connecting said second interface to transfer information to said printer interface, said means for interrupting comprising
- means for copying data received from said second interface to a predefined macro within a memory of said system, and
- means for transferring said predefined macro from said memory to said printer interface, whereby said macro and said copied data are transferred to said printer.

12. The system of claim 11 wherein said means for interrupting further comprises means for continuously examining said first interface and said second interface and for connecting said second interface to said printer interface upon receiving a datum or a command from said second interface.

13. The system of claim 12 further comprising means for disconnecting said second interface from said printer interface and reconnecting said first interface to said printer interface if said second computer sends a termination signal.

14. The system of claim 12 further comprising means for disconnecting said second interface from said printer interface and reconnecting said first interface to said printer interface if said second interface has not received a datum or a command for a predetermined period of time.

15. The system of claim 11 wherein said predefined macro causes said printer to save a previous state of said printer prior to printing said copied data and causes said printer to restore said previous state of said printer after printing said copied data.

* * * * *